United States Patent
Marangon et al.

(10) Patent No.: US 10,450,032 B2
(45) Date of Patent: Oct. 22, 2019

(54) ACTUATION DEVICE OF THE CONTROL CABLE OF A BICYCLE DERAILLEUR

(71) Applicant: CAMPAGNOLO S.r.l., Vicenza (IT)

(72) Inventors: Christian Marangon, Thiene (IT); Marco Minto, Mirano (IT)

(73) Assignee: CAMPAGNOLO S.r.l., Vicenza (IT)

( * ) Notice: Subject to any disclaimer, the term of this patent is extended or adjusted under 35 U.S.C. 154(b) by 0 days.

(21) Appl. No.: 15/827,803

(22) Filed: Nov. 30, 2017

(65) Prior Publication Data

US 2018/0154983 A1   Jun. 7, 2018

(30) Foreign Application Priority Data

Dec. 2, 2016 (IT) .................. 102016000122800

(51) Int. Cl.
| | |
|---|---|
| *B62M 25/04* | (2006.01) |
| *B62K 23/06* | (2006.01) |
| *B62M 9/1242* | (2010.01) |
| *B62M 9/1248* | (2010.01) |

(52) U.S. Cl.
CPC .......... *B62M 9/1242* (2013.01); *B62K 23/06* (2013.01); *B62M 9/1248* (2013.01); *B62M 25/04* (2013.01)

(58) Field of Classification Search
CPC .... B62M 25/04; B62M 25/02; B62M 9/1242; B62M 9/1248; B62K 23/06; B62K 23/02
See application file for complete search history.

(56) References Cited

U.S. PATENT DOCUMENTS

| | | | |
|---|---|---|---|
| 5,676,020 A | 10/1997 | Jordan et al. | |
| 6,216,553 B1 | 4/2001 | Wessel et al. | |
| 6,367,347 B1 * | 4/2002 | Blaschke ............... | B62M 25/04 |
| | | | 74/473.13 |
| 6,484,603 B2 | 11/2002 | Wessel et al. | |
| 7,285,064 B2 | 10/2007 | Ichida et al. | |
| 7,461,573 B2 * | 12/2008 | Dal Pra ................. | B62K 23/06 |
| | | | 74/502.2 |

(Continued)

FOREIGN PATENT DOCUMENTS

| | | |
|---|---|---|
| CN | 204606125 U | 9/2015 |
| EP | 1342654 A2 | 9/2003 |

(Continued)

OTHER PUBLICATIONS

Italian Search Report and Written Opinion in Italian Application No. 102016000122800, dated Aug. 31, 2017, with English translation.

*Primary Examiner* — Luis A Gonzalez
(74) *Attorney, Agent, or Firm* — Volpe and Koenig, P.C.

(57) ABSTRACT

A bicycle gearshift cable control device that is rotatable about a control pin, in opposite angular directions, and has an indexer mounted coaxially to the control pin that defines a plurality of spaced apart, stable angular positions for the cable-winding bush. Elastic members that store elastic energy during a rotation of the control pin in one angular direction and release the stored elastic energy stored at the end of the rotation of the control pin are configured to cause a stroke recovery rotation of the control pin in the opposite angular direction during the release of the stored elastic energy. The stroke recovery rotation is smaller than the indexing angle that separates two adjacent stable positions of the cable-winding bush.

19 Claims, 5 Drawing Sheets

(56) References Cited

U.S. PATENT DOCUMENTS

| | | | |
|---|---|---|---|
| 8,061,233 B2* | 11/2011 | Dal Pra | B62M 25/04 |
| | | | 74/502.2 |
| 8,485,060 B2 | 7/2013 | Emura et al. | |
| 8,550,942 B2 | 10/2013 | Oda et al. | |
| 10,160,515 B2* | 12/2018 | Minto | B62M 9/134 |
| 10,300,988 B2* | 5/2019 | Marangon | B62M 25/04 |
| 2004/0261560 A1* | 12/2004 | Tsai | B62K 23/04 |
| | | | 74/473.25 |
| 2007/0034037 A1 | 2/2007 | Dal Pra et al. | |
| 2007/0227287 A1 | 10/2007 | Righi et al. | |
| 2017/0341709 A1* | 11/2017 | Marangon | B62K 23/06 |
| 2019/0016413 A1* | 1/2019 | Qin | B62M 25/04 |

FOREIGN PATENT DOCUMENTS

| | | |
|---|---|---|
| EP | 2527240 A1 | 11/2012 |
| KR | 20130068770 A | 6/2013 |

* cited by examiner

ACTUATION DEVICE OF THE CONTROL CABLE OF A BICYCLE DERAILLEUR

CROSS REFERENCE TO RELATED APPLICATION(S)

This application claims the benefit of Italian Application No. 102016000122800, filed on Dec. 2, 2016, which is incorporated herein by reference as if fully set forth.

FIELD OF INVENTION

The present invention relates to an actuation device of the control cable of a bicycle derailleur, adapted for being mounted on bicycle handlebars. Preferably, the bicycle is a racing bicycle.

BACKGROUND

A bicycle is normally provided with a rear derailleur active on a groupset, which consists of a series of coaxial toothed wheels (sprockets) of different diameters and number of teeth coupled with the hub of the rear wheel.

The derailleur engages a transmission chain extending in a closed loop between the groupset and the crankset, moving it on toothed wheels having different diameter and number of teeth, so as to obtain different gear ratios.

In particular, downward gearshifting is said when the chain passes from a toothed wheel of larger diameter to a toothed wheel of smaller diameter, and upward gearshifting is said when the chain moves from a toothed wheel of smaller diameter to a toothed wheel of larger diameter. Concerning this, it should be noted that with reference to the rear derailleur, downward gearshifting corresponds to the passage to a higher gear ratio and upward gearshifting corresponds to the passage to a lower gear ratio.

The movement in the two directions of the rear derailleur is obtained through an actuation device mounted on the handlebars so as to be easy for the cyclist to maneuver.

More in particular, in a mechanical gearshift, the rear derailleur is moved between the toothed wheels of the groupset, in a first direction by a traction action exerted by an inextensible control cable that is normally sheathed (commonly called Bowden cable), in a second opposite direction by the release of the traction of the cable and by the elastic return action of a spring provided in the derailleur itself.

The movement of the rear derailleur is carried out according to an articulated parallelogram linkage wherein the sides of the parallelogram are articulated in pairs, along respective substantially parallel rotation axes, through pins. In particular, such an articulated parallelogram is formed from a support body, intended to remain fixed with respect to the frame, a so-called chain-guide adapted for moving the chain between different engagement positions on the toothed wheels, and a pair of articulation arms or connecting rods (generally identified as outer connecting rod and inner connecting rod), which connect the chain-guide in a mobile manner to the support body.

The traction of the control cable opposes the action of an elastic spring active in the rear derailleur that tends to push the connecting rods of the derailleur towards the smaller gear of the groupset, whereas the release of the control cable frees the elastic energy of such a spring.

Therefore, the traction or the release of the control cable determine respective rotations of the connecting rods of the derailleur with the consequent movement of the chain-guide that faces makes the chain face the desired toothed wheel for precise gearshifting.

Normally, the direction in which the movement is determined by the release of the traction of the cable and by the return spring is that of downward gearshifting; vice-versa, the traction action of the control cable takes place in the direction of upward gearshifting, wherein the chain moves from a wheel of smaller diameter to a wheel of larger diameter.

In the actuation device, the control cable is actuated in traction or in release through winding and unwinding on a rotor element, commonly called cable-winding bush, the rotation of which is carried out by the cyclist with a suitable control lever, or with two control levers (a first lever for upward gearshifting and a second lever for downward gearshifting).

In any case, the actuation device must provide for the cable-winding bush to be kept stationary in rotation in a number of predetermined angular positions, spaced apart by predetermined indexing angles and corresponding to the different positions of the derailleur required by the different ratios, namely on the different toothed wheels of the groupset. This function is obtained with the so-called indexers, many types of which are known in the field, variously active between the cable-winding bush and the fixed casing of the device.

Examples of such indexers can be found in documents U.S. Pat. No. 6,216,553, U.S. Pat. No. 5,676,020, EP2527240 and U.S. Pat. No. 6,484,603.

During downward gearshifting, the control cable is released by an amount such as to allow the indexer to stop the rotation of the cable-winding bush at the indexing angle necessary to position the transmission chain exactly on the preselected toothed crown of the groupset, so as to allow precise and reliable gearshifting.

The Applicant has noted that, although precise and reliable, downward gearshifting is not always prompt, in other words it is not reactive and immediate, since the release of the control cable has a certain inertia in activating the elastic spring of the rear derailleur that moves the connecting rods of the derailleur.

The Applicant has indeed noted that in order to carry out downward gearshifting it is necessary for the slack of the control cable to propagate completely to the elastic spring of the rear derailleur, so that the elastic energy freed by it moves the connecting rods by the amount necessary to reposition the chain-guide at the toothed wheel to be engaged. The complete propagation of such slack is not instantaneous but is subject to the mechanical inertia of the linkage of the gearshift.

The Applicant has perceived that an extra stroke of the control cable during downward gearshifting would allow much more reactive downward gearshifting, since the rear derailleur would move to the toothed wheel to be engaged before the slack of the control cable has completely propagated to the derailleur itself.

The Applicant has, however, found that in this way, when the slack of the control cable has completely propagated to the rear derailleur, the rear derailleur would position the transmission chain not perfectly at the toothed wheel to be engaged but in an intermediate position between the toothed crown to be engaged and the immediately smaller one with consequent instability of gearshifting.

SUMMARY

The Applicant's solution provides an actuation device for the control cable of a bicycle gearshift that elastic members configured to deform and store elastic energy during a downward gearshifting and to release the stored energy at the end of the downward gearshifting to cause a stroke recovery rotation that is of smaller angular size than the indexing angle that separates two adjacent stable positions of the cable-winding bush associated with the control cable.

BRIEF DESCRIPTION OF THE DRAWINGS

Further features and advantages of the invention will become clearer from the following description of preferred embodiments thereof, made with reference to the attached drawings. In such drawings.

DETAILED DESCRIPTION OF THE PREFERRED EMBODIMENTS

The present invention therefore relates to an actuation device of the control cable of a bicycle gearshift comprising:

a casing, configured for fixing to bicycle handlebars, a control pin mounted rotatably in said casing about a rotation axis, a control lever mobile with respect to said casing and active on a descent member coaxial and fixedly connected to said control pin, a cable-winding bush mounted coaxially to, and rotatable with, the control pin in a first angular direction and in a second angular direction opposite the first, an indexer mounted coaxially to the control pin and configured to define a plurality of stable angular positions, spaced apart by respective indexing angles, for said cable-winding bush, elastic members configured to deform and store elastic energy during a downward gearshifting rotation of the control pin in said second angular direction; said elastic members being configured to release the elastic energy stored at the end of the downward gearshifting rotation of the control pin and being configured to cause a stroke recovery rotation of the control pin in said first angular direction, during the release of the elastic energy stored; said stroke recovery rotation being of smaller angular size than the indexing angle that separates two adjacent stable positions of the cable-winding bush.

The cable-winding bush is set in rotation by the cyclist by acting on the control that sets the descent bush in rotation, which, rotating as a unit with the control pin, set the control pin and the cable-winding bush in rotation.

The indexer allows the cable-winding bush to reach stable angular positions corresponding to positions of the rear derailleur that position the transmission chain at the toothed wheels of the groupset.

Rotations of the cable-winding bush in the second angular direction correspond to releases of the control cable that determine movements of the derailleur towards downward gearshifting operations.

The Applicant has perceived that by providing elastic members that deform accumulating elastic energy during a rotation of the control pin in the second angular direction and that return such elastic energy once the downward gearshifting has ended, it is possible to make the cable-winding bush carry out an extra downward stroke in opposition to the cited elastic members, recovering such an extra stroke following the release of the elastic energy accumulated by the elastic members.

The Applicant has further perceived that by providing the angular size of the recovery stroke so that it is less than the indexing angle that separates two adjacent stable positions on the indexer, the extra stroke of the cable-winding bush actuated by the elastic members positions the rear derailleur between two adjacent toothed wheels of the groupset.

In this way, it is possible to make the cable-winding bush carry out an excursion in the second angular direction that is greater than that strictly necessary to take the derailleur to the toothed wheel of immediately smaller diameter (but not such as to take the derailleur to the toothed wheel of even smaller diameter), then making the cable-winding bush rotate in the first angular direction to recover the extra downward stroke carried out and lock it stably in the angular position reached.

This allows more prompt and reactive downward gearshifting, since the release of the control cable is greater than that strictly necessary to position the rear derailleur at the preselected toothed wheel of the groupset. Furthermore, when downward gearshifting has been carried out, the control cable is stretched out by the rotation of the cable-winding bush in the first angular direction positioning the rear derailleur and the transmission chain at the preselected toothed wheel of the groupset and locking the cable-winding bush in the angular position reached.

The term "elastic deformation" is meant to indicate, in the present description and in the attached claims, a deformation of the elastic members that disappears as the stress stops. The term elastic energy "accumulated" or "stored" and the like, is meant to indicate the increase in potential energy of the elastic members during the elastic deformation. Equally, the term elastic energy "released" and the like is meant to indicate the decrease in potential energy of the elastic members to take them back into the condition prior to the start of the deformation.

The rotation axis of the control pin is the main reference axis for the elements that form part of the device of the present invention; all of the indications of direction and the like, such as "axial", "radial", "circumferential" and "diametral", will refer to it; equally, the indications "outwards" and "inwards" referring to radial directions must be taken as away from the axis or towards the axis. Two opposite angular directions are also defined about the axis.

The actuation device of the control cable of a derailleur of a bicycle of the present invention can comprise one or more of the following preferred features, taken individually or in combination.

Preferably, the angular excursion of the cable-winding bush necessary to make the elastic members accumulate elastic energy is equal in absolute value to the angular excursion of the cable-winding bush when the elastic members release the elastic energy accumulated.

Preferably, the indexer comprises:

a ball-holding bush mounted in the casing in a rotatable manner about the rotation axis and equipped with at least one pointer;

an indexing bush mounted in the casing and provided with a fastening track comprising a plurality of stop positions able to be engaged in sequence by said pointer during a relative rotation between the ball-holding bush and the indexing bush, each stop position defining a stable angular position for said cable-winding bush;

the force couple necessary to rotate said ball-holding bush with respect to said indexing bush being greater than the force couple necessary to deform said elastic members by a predetermined amount.

The pointer of the ball-holding bush, when it engages a stop position of the indexing bush, makes the cable-winding bush and the ball-holding bush rotate as a unit, holding the cable-winding bush in position. In order to position the pointer in a new stop position it is necessary to apply a force couple on the ball-holding bush so as to disengage the pointer from the current stop position. Such a force couple is provided by the cyclist when acting on the control that sets the descent bush in rotation.

The Applicant has perceived that by arranging the elastic members so that the force couple necessary to elastically deform them by a predetermined amount is less than the force couple necessary to release the pointer of the ball-holding bush from the stop position on the indexing bush, the cable-winding bush can carry out a rotation in the second angular direction whereas the indexing bush and the ball-holding bush still rotate as a unit with each other.

In this condition, the angular excursion in the second angular direction carried out by the cable-winding bush has no effect on the indexer but still moves the rear derailleur. Such an angular excursion of the cable-winding bush coincides with the extra downward stroke of the derailleur.

The predetermined deformation of the elastic members beyond which the force couple exerted by the cyclist releases the cable-winding bush from the indexing bush is determined as a function of the extra rotation excursion in the second angular direction that it is wished to make the cable-winding bush carry out to promote downward gearshifting.

Preferably, such a predetermined amount of deformation of the elastic members is such as to make the cable-winding bush carry out a rotation in the second angular direction that is smaller than an indexing angle.

When the force couple exerted by the cyclist on the control pin has deformed the elastic members by the predetermined amount (and therefore the resistant force couple offered by them has increased), the further force couple exerted by the cyclist moves the pointer in a new stop position. The release of the control by the cyclist determines the recovery of the extra downward stroke through the effect of the release of the elastic energy accumulated by the elastic members, which generate a rotation in the first angular direction of the cable-winding bush with the ball-holding bush and the indexing bush rotating as a unit.

In a first embodiment of the invention, preferably said elastic members are active between said indexing bush and said casing.

In this way, the ball-holding bush is fixedly connected to the control pin. The ball-holding bush sets the indexing bush in rotation, which rotates in opposition to the elastic members until the force couple exerted by the cyclist on the control pin is such as to overcome the resistant force couple offered by the deformed elastic members and, as stated above, to release the ball-holding bush from the indexing bush. The rotation carried out by the indexing bush during the deformation of the elastic members is equal to the extra downward stroke of the cable-winding bush.

Preferably, the elastic members are active along a circumferential direction.

This allows the elastic members to act in a circumferential direction and to be deformed (and to release the elastic energy stored) by the rotation of the indexing bush.

Preferably, said indexing bush is mounted idly with respect to said control pin and comprises a radially outer tab configured to intercept a lower end stop of the casing; the rotation of the indexing bush being limited in the second angular direction by the lower end stop.

In this way, when the force couple exerted on the control pin has deformed the elastic members, the indexing bush cannot rotate further in the second angular direction with respect to the casing. The ball-holding bush can thus disengage from the indexing bush and rotate with respect to the latter to take the pointer into a new stop position.

Preferably, said elastic members are arranged on said casing and define said lower end stop.

In this way, it is possible to limit the maximum size of the deformation of the elastic members.

Preferably, said elastic member comprises an elastic body having a base wall mounted on said casing and two side walls that extend axially away from said base wall; said side walls being elastically yielding in the circumferential direction.

In this way, the indexing bush and, preferably the radially outer tab thereof, contacts a side wall of the elastic body deforming it in the direction of the other side wall.

In this embodiment, preferably the descent member is formed on the ball-holding bush, in particular on a radially outer surface thereof.

Preferably, in a variant of the first embodiment of the invention, said elastic member comprises an elastomer having a first end constrained to said casing and a second free end that extends circumferentially away from the first end.

In a second embodiment of the invention, preferably said elastic members couple said ball-holding bush with said control pin in rotation.

In this way, the indexing bush can be fixedly connected to the casing during rotations in the second angular direction of the control pin. The indexing bush holds the ball-holding bush in rotation. The elastic members, deforming, allow the control pin to rotate and to set the cable-winding bush in rotation. When the resistant force couple of the elastic members reaches the predetermined threshold, the force couple exerted by the cyclist on the control pin transfers to the ball-holding bush that rotates as a unit with the control pin and disengages the indexing bush taking the pointer in a new stop position. The rotation carried out by the control pin during the deformation of the elastic members is equal to the extra downward stroke of the cable-winding bush.

In this embodiment, the descent member is a descent bush rotating as a unit with the control pin and distinct from the ball-holding bush.

Preferably, said elastic members are active between said ball-holding bush and said descent bush.

In this way, the force couple exerted by the cyclist, during downward gearshifting, on the control and directly transferred to the descent bush transfers to the ball-holding bush only when such a force couple exceeds the predetermined value of resistant force couple offered by the elastic members.

Preferably, the ball-holding bush is idle on the control pin, the rotation of the ball-holding bush being carried out directly by the descent bush.

Preferably, the descent bush rotates as a unit with the control pin.

Preferably, the indexing bush is mounted idly with respect to the control pin and fixedly connected to the casing at least with respect to rotations in the second angular direction.

Preferably, one from said ball-holding bush and said descent bush comprises axial teeth inserted in housing seats formed on the other from said ball-holding bush and said descent bush; said elastic members comprising blocks made of elastomeric material inserted in said housing seats and circumferentially in abutment against said axial teeth.

In this way, the elastic members axially couple the descent bush and the ball-holding bush with each other, containing the radial bulk.

Preferably, each block made of elastomeric material is inserted in a respective housing seat.

Preferably, each housing seat houses an elastomeric block and an axial tooth; the axial tooth preceding the elastomeric block along said second angular direction.

In this way, the axial tooth is in circumferential abutment against the elastomeric block and the latter is in circumferential abutment against the housing seat, ensuring the deformation of the elastomeric block during a rotation in the second angular direction.

Preferably, the circumferential extension of said housing seats is equal to the sum of the circumferential extensions of said blocks made of elastomeric material and of said axial teeth.

With reference to the figures, preferred embodiments of the actuation device of the control cable of a bicycle derailleur in accordance with the present invention are shown. The actuation device is wholly indicated with 10.

Figure 1:
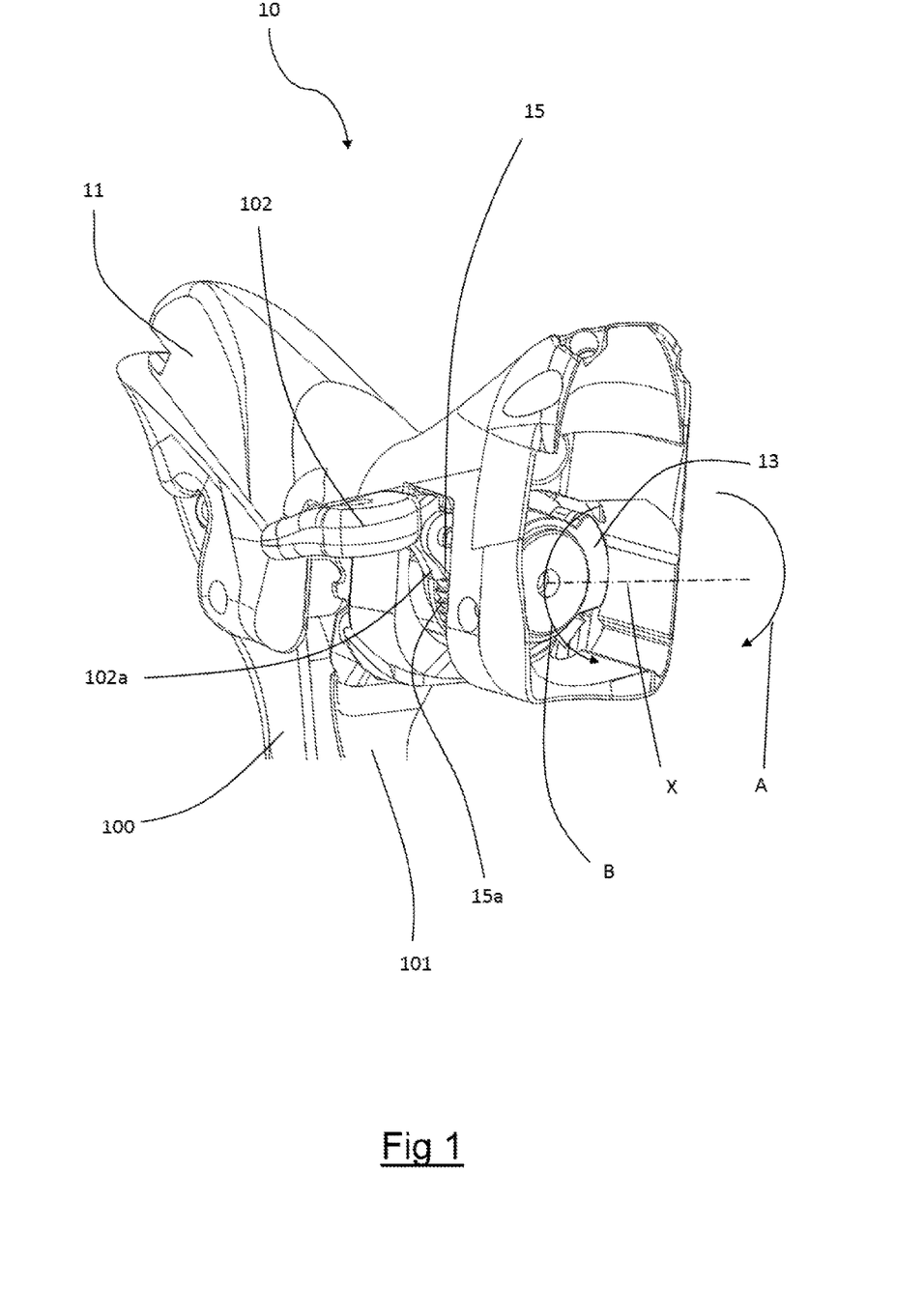
FIG. 1 is a perspective view of an actuation device of the control cable of a bicycle derailleur according to the invention.

The device 10 comprises a casing 11 that is fixed to the handlebars of a bicycle in a conventional manner, for example through a strap that preferably also constrains a brake lever 100 (in part visible in FIG. 1) to the handlebars.

Figure 2:
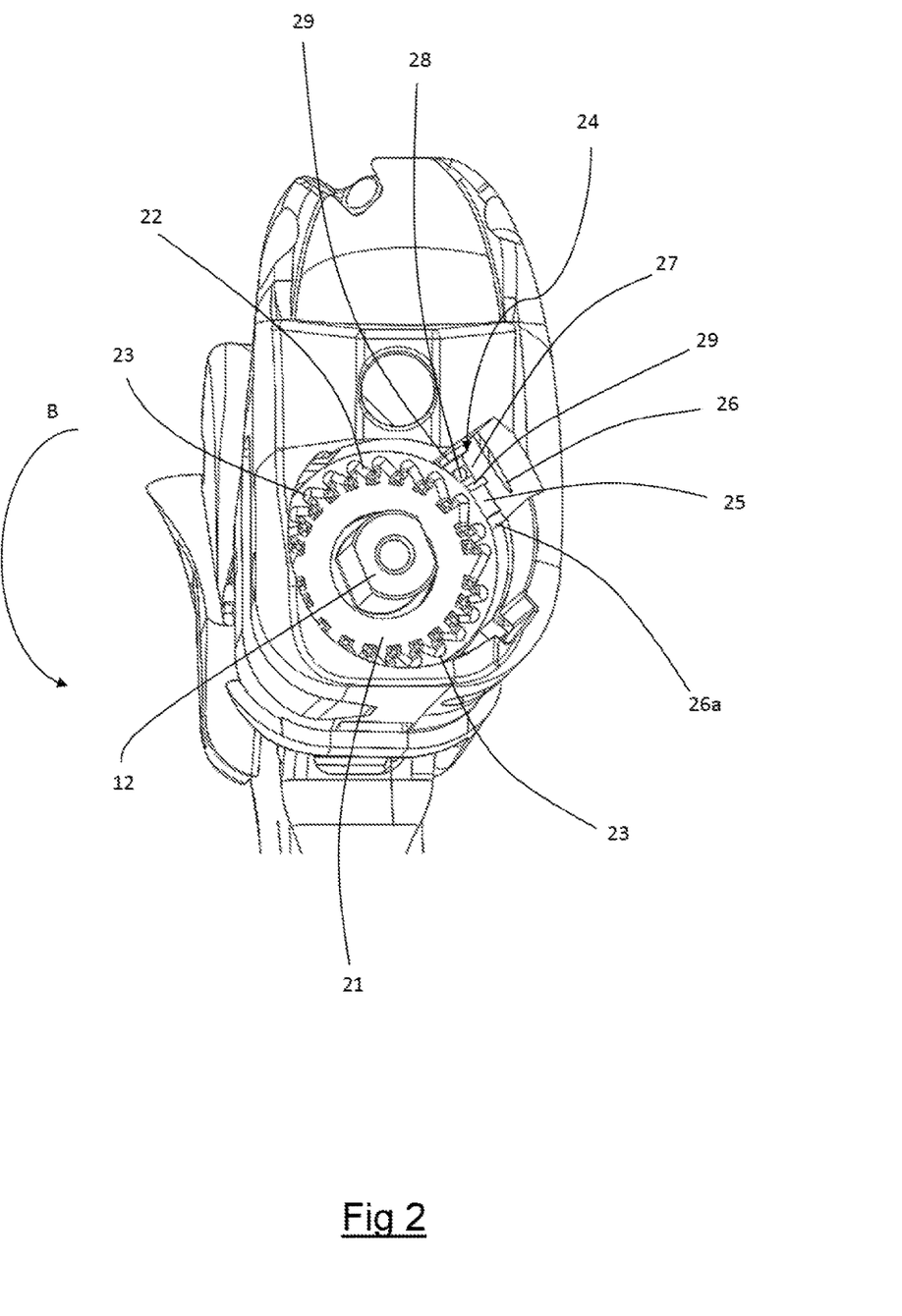
FIG. 2 is a perspective view of a first embodiment of the actuation device of FIG. 1 with some parts removed to better highlight others.

In the casing there is a control pin 12, see FIG. 2, rotatable inside the casing about a rotation axis X. Two opposite angular directions are defined about the rotation axis X, a first A and a second angular direction B, respectively.

The control pin 12 is angularly rotatable about the rotation axis X in the first A and in the second angular direction B between a first angular position and a last angular position. The first and the last angular position of the control pin 12 are delimited by end stops preferably fixedly connected to the casing 11.

The control pin 12 is set in rotation, preferably through an ascent member, by an actuation lever 101 to rotate in the first angular direction A and by a control 102, active on a descent member 15 to rotate in the second angular direction B. The descent member 15 rotates as a unit with the control pin 12 and comprises radial pulling teeth 15a engageable by a hook 102a of the control 102, see FIG. 1.

The device 10 further comprises a cable-winding bush 13, to which a control cable (not illustrated) is fixed and on which it is wound, at a first end. The other end of the control cable is fixed to the rear derailleur (not illustrated) so as to control the movement thereof with respect to the toothed wheels of a groupset (not illustrated).

The cable-winding bush 13 is mounted in the casing and is angularly rotatable about the rotation axis X in the first A and in the second angular direction B. The cable-winding bush 13 can rotate between an angular position in which the winding of the control cable is minimum and an angular position in which the winding of the control cable is maximum, and vice-versa.

Between the position of minimum tension of the control cable and the position of maximum tension of the control cable there are intermediate angular positions of the cable-winding bush 13 distinct from one another and angularly spaced apart by indexing angles. Every angular position of the cable-winding bush 13 corresponds to an angular position of the rear derailleur with respect to the toothed wheels of the groupset.

In particular, the position of minimum tension of the control cable corresponds to a positioning of the transmission chain at the smallest toothed wheel (in other words of smallest diameter) of the groupset. The position of maximum tension of the control cable corresponds to a positioning of the transmission chain at the largest toothed wheel (in other words of greatest diameter) of the groupset.

The cable-winding bush 13 rotates as a unit with the control pin 12 in the entire angular excursion of the cable-winding bush 13 between the position of minimum tension and the position of maximum tension of the control cable (and vice-versa), so that the actuation of the control pin 12 (through the control lever) by the cyclist determines useful derailing of the rear derailleur.

The device 10 further comprises an indexer 14 to allow the control pin 12 (and therefore the cable-winding bush 13) to assume stable angular positions.

Figure 5:
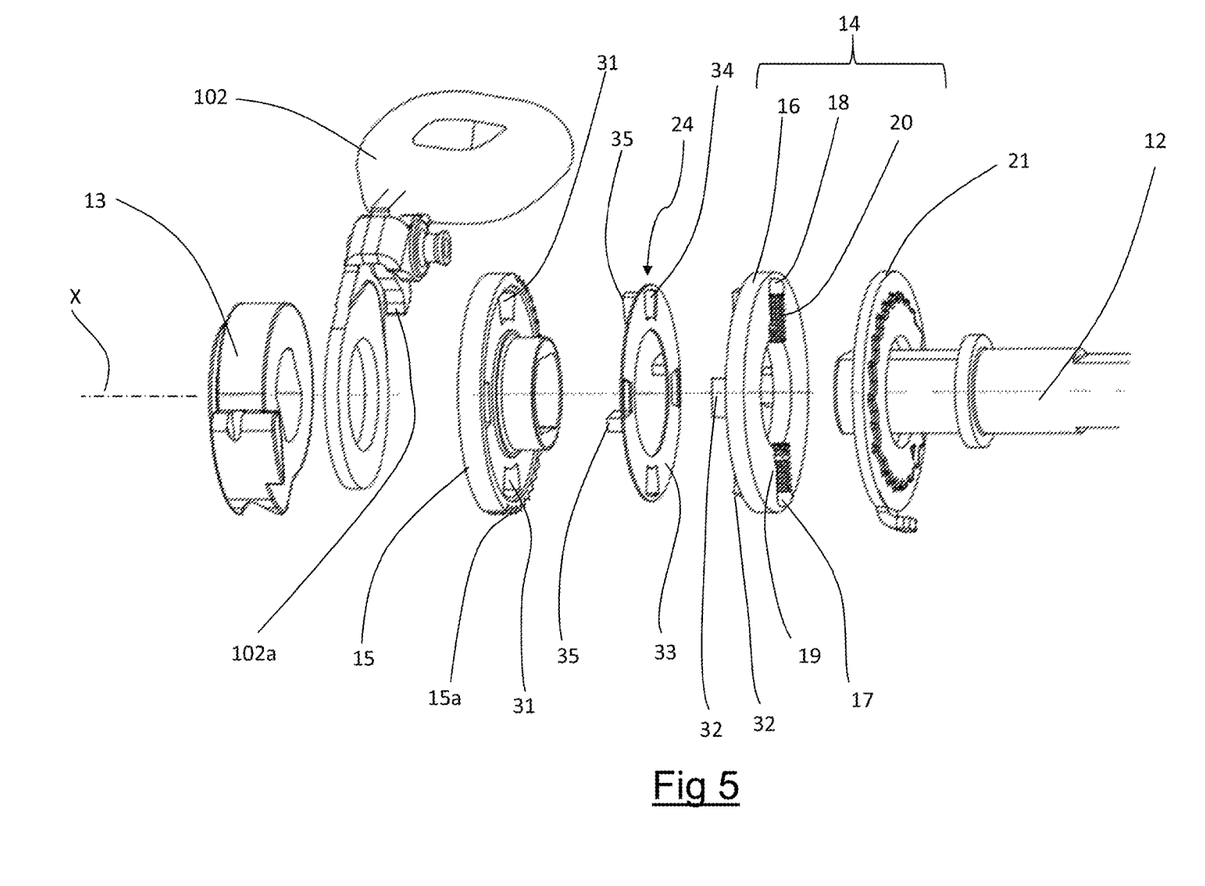
FIG. 5 is an exploded perspective view of a second embodiment of the actuation device of FIG. 1.
Figure 6:
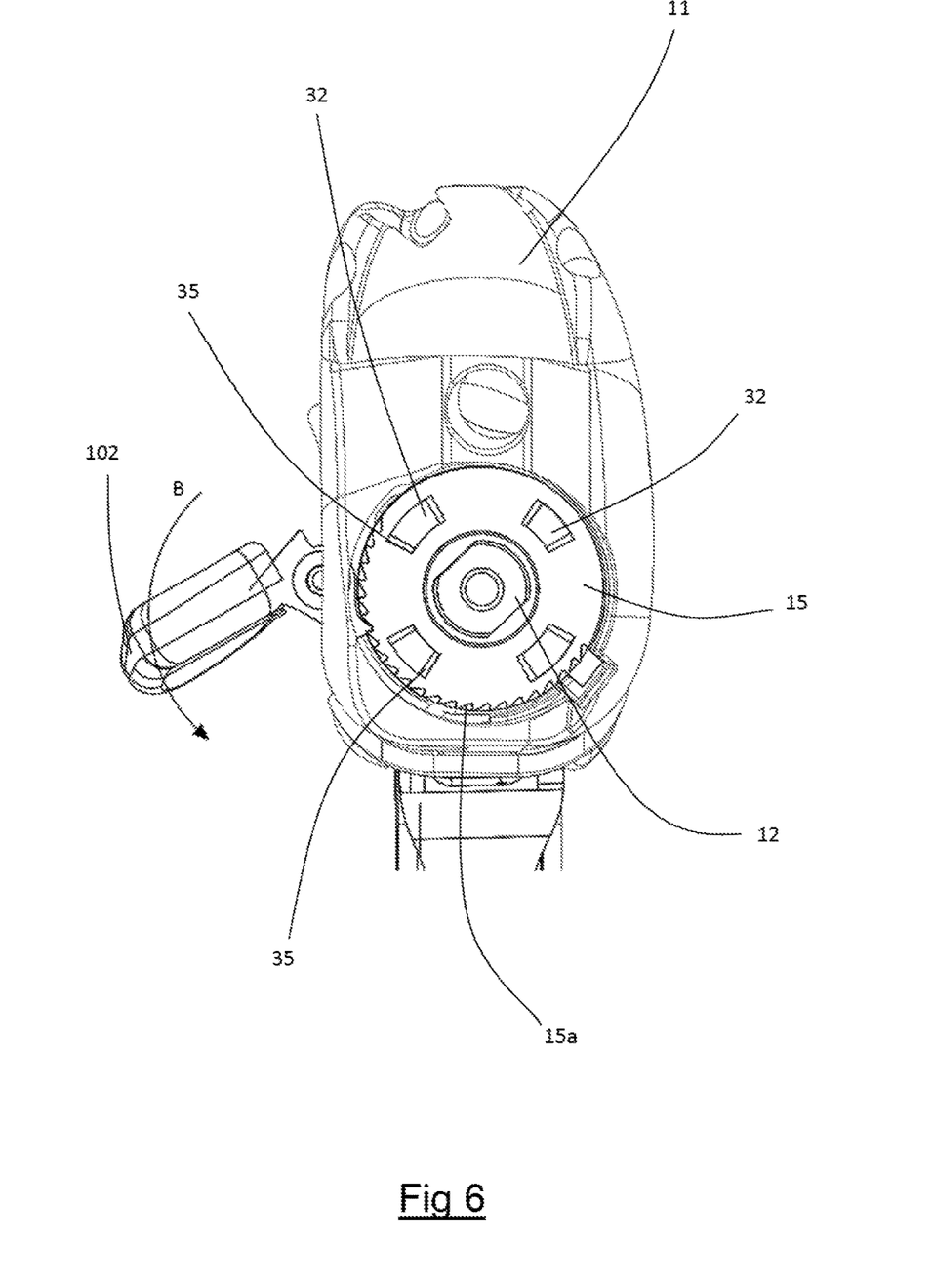
FIG. 6 is a rear view of the device of FIG. 5 with some parts removed to better highlight others.

The indexer 14 is equipped with a ball-holding bush 16 mounted in the casing in a rotatable manner about the rotation axis X. The ball-holding bush 16 is equipped with a first pointer 17 and a second pointer 18 (FIG. 5). The two pointers 17, 18 are preferably spherical bodies.

Each pointer 17, 18 is radially slidable in respective opposite radial throats 19 formed in the ball-holding bush 16. The two pointers 17, 18 are elastically biased outwards in the throats 19 by respective springs 20 mounted in the throats 19. The springs position the pointers 17, 18 at the radial end of the respective throat 19. The throats 19 are open at one side of the ball-holding bush 16 so that the pointers emerge partially from the axial bulk of the ball-holding bush 16, making pointers projecting in the axial direction.

The indexer 14 further comprises an indexing bush 21 provided with a fastening track 22 (FIG. 2). The two pointers 17, 18 are engaged on the fastening track 22.

The fastening track 22 directly faces the ball-holding bush 16 so that the pointers 17, 18 engage the fastening track 22. The axial depth of the fastening track 22 is such as to receive the portion of pointers 17, 18 that emerges axially from the ball-holding bush 16.

The fastening track 22 comprises stop areas 23 engageable in sequence by the two pointers 17, 18. The stop areas 23 determine stable positions for the pointers along the fastening track 22 and are spaced apart by indexing angles, see FIG. 5.

Preferably, the fastening track 22 is operatively divided into two half-parts each of which is engaged by a respective pointer 17, 18, so that identical stop areas 23 are angularly spaced by 180°.

When the ball-holding bush 16 rotates with respect to the indexing bush 21, each pointer 17, 18 passes from one stop area 23 to an adjacent stop area 23 taking the ball-holding bush 16 into a new stable angular position.

In particular, during downward gearshifting, the ball-holding bush 16 rotates with respect to the indexing bush 21 in the second angular direction B and the two pointers 17, 18 slide in the fastening track 22 and reach a new stop area 23.

The device 10 is equipped with elastic members 24 which deform elastically during downward gearshifting, in other words during a rotation in the second angular direction B of the control pin 12.

The elastic members 24 do not intervene, in other words forces are not transmitted to them, during upward gearshifting.

The elastic members 24 are selected so that the force couple necessary to rotate the ball-holding bush 16 with respect to the indexing bush 21, in other words to position the pointers 17, 18 in a new stop position 23, is greater than the force couple necessary to deform the elastic members 24 by a predetermined amount.

In a first preferred embodiment of the invention, the elastic members 24 are positioned fixedly connected to the casing 11 and active between the latter and the indexing bush 21.

In this embodiment, ball-holding bush 16 rotates as a unit with the control pin 12.

The ball-holding bush 16 integrates the descent member 15. In particular the pulling teeth 15a are arranged on the radially outer surface of the ball-holding bush 16.

The indexing bush 21 is mounted on the control pin 12 in a freely rotatable manner with respect to it.

The indexing bush 21 comprises a tab 25 which projects radially outside from the generally cylindrical shape of the indexing bush 21. The tab 25 is inserted in a radial niche 26 of the casing 11 having a predetermined circumferential extension.

The elastic members 24 are positioned inside the niche 26, so that the tab 25 interacts with them.

In particular, the tab 25 is arranged between a shoulder 26a of the niche 26 and the elastic members 24, so that the shoulder 26a and the elastic members 24 act, respectively, as upper end stop and as lower end stop for the tab 25.

The circumferential extension of the tab 25 is equal to the distance in the circumferential direction between the elastic members 24 (in undeformed condition) and the shoulder 26a.

As illustrated in FIG. 2, the shoulder 26a precedes, along the second angular direction B, the tab 25 that in turn precedes, along the same direction, the elastic members 24.

When the control pin 12 is set in rotation in the second angular direction B, the ball-holding bush 16 rotates as a unit with the control pin 12 and with the cable-winding bush 13. The ball-holding bush 16 pulls the indexing bush 21 in rotation that, with the tab 25, exerts a force on the elastic members 24. The latter deform, accumulating elastic energy until the force couple exerted on the control pin 12 exceeds a value necessary to deform the elastic members 24 by a predetermined amount.

The cable-winding bush 13 carries out a rotation in the second angular direction B, moving the rear derailleur towards a smaller toothed wheel of the groupset.

When such a value is exceeded, the force couple exerted on the ball-holding bush 16 sets the latter in rotation with respect to the indexing bush 14 engaging a new stop position 23 thereof. The indexing bush 21 does not rotate since it is in abutment on the lower end stop (given by the deformed elastic members 24).

The cable-winding bush 13 thus continues to rotate and, in particular, carries out a rotation equal to the indexing angle that separates the two stop positions 23 on the indexing bush 21. Such a rotation is such as to move the rear derailleur further by an amount coinciding with the distance that separates two adjacent toothed wheels of the groupset.

Therefore, when the ball-holding bush 16 is positioned in a new stop position 23 on the indexing bush 21, the cable-winding bush has carried out a rotation in the second angular direction B equal to the sum of the indexing angle and of the initial rotation to deform the elastic members 24.

The downward gearshifting is thus made easier and prompt.

When the cyclist stops pressing on the control 102, the control pin 12 is no longer subjected to any force couple. The elastic energy stored in the elastic members 24 is released onto the tab 25 that rotates the indexing bush 21 in the first angular direction A. The indexing bush 21 makes the ball-holding bush 16 rotate, which sets the control pin 12 in rotation. The cable-winding bush 13 therefore rotates in the first angular direction A by an amount equal to the initial rotation in the second angular direction B. The final net rotation of the cable-winding bush 13 is therefore equal to the indexing angle between the two stop positions 23 engaged by the sliders.

The elastic members 24 can be any body capable of deforming elastically.

Figure 3:
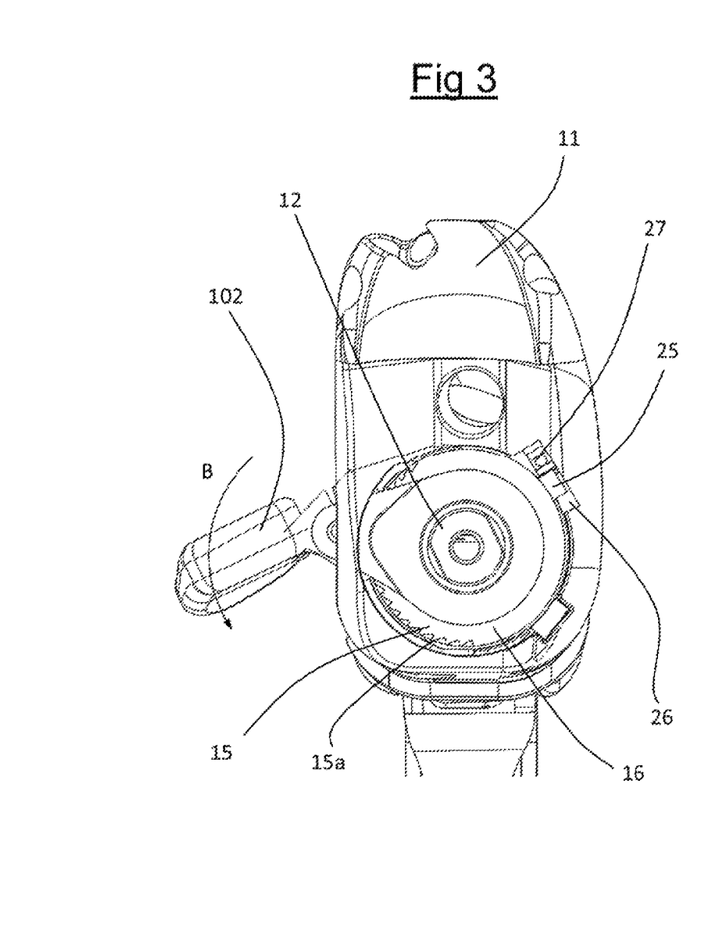
FIG. 3 is a rear view of the actuation device of FIG. 2.

For example, as shown in FIGS. 2 and 3, the elastic members 24 comprise a body 27 having a base wall 28 constrained in the niche 26 of the casing 11. Two elastically yielding side walls 29 extend in the axial direction from the base wall 28. One of such side walls 29 is in contact with the tab 25 of the indexing bush 21 and the other side wall 29 is in contact with a wall of the niche 26.

Figure 4:
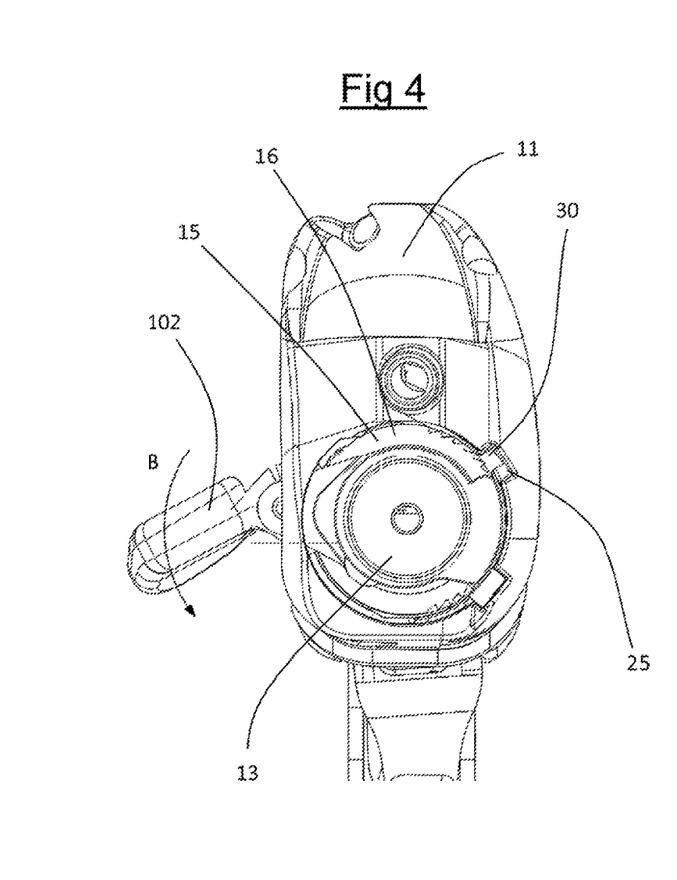
FIG. 4 is a rear view of the device of FIG. 2 in a variant embodiment.

Alternatively, as shown in FIG. 4, the elastic members 24 are made from a block 30 of elastomeric material having a first end constrained in the niche 26 and a second free end in contact with the tab 25 of the indexing bush 21.

In a second embodiment of the invention, the descent member 15 is physically distinct from the ball-holding bush 16. The descent member 15 is made from a descent bush. The descent bush 15 has, in a radially outer position, the pulling teeth 15a.

In this embodiment the elastic members 24 are arranged between the ball-holding bush 16 and the descent bush 15, as illustrated in FIG. 5.

The ball-holding bush 16 is mounted freely rotatable on the control pin 12 and is made to rotate by the descent bush 15 which rotates as a unit with the control pin 12.

The indexing bush 21 is mounted freely rotatable on the control pin 12 and is fixed, at least during downward gearshifting, to the casing 11.

The descent bush 15 comprises housing seats 31 formed on a surface thereof facing the ball-holding bush 16.

The ball-holding bush 16 comprises teeth 32 extending axially inserted in the housing seats 31. The teeth 31 extending axially have a shorter extension in the circumferential direction than the extension in the same direction as the housing seats 31, so that the axial teeth 32 are received with clearance in the housing seats 31 (for the reasons that will be described hereinafter).

The elastic members 24 comprise a ring 33 arranged between the ball-holding bush 16 and the descent bush 15.

The ring 33 has through openings 34 facing the housing seats 31 and crossed by the teeth 32 extending axially.

The through openings 34 have a circumferential extension equal to the circumferential extension of the teeth 32 extending axially, so as to receive them snugly.

On the side facing towards the descent bush 15, the ring 33 comprises blocks 35 made of elastomeric material inserted in the housing seats 31. The blocks 35 made of elastomeric material have a shorter circumferential extension than the circumferential extension of the housing seats 31.

The sum of the circumferential extensions of the elastomeric blocks 35 and of the axial teeth 32 is equal to the circumferential extension of the housing seats 31.

Inside the housing seats 31, the axial teeth 32 precede, along the second angular direction B, the blocks 35 made of elastomeric material.

When the control pin 12 is set in rotation in the second angular direction B, the descent bush 15 rotates as a unit with the control pin 12 and with the cable-winding bush 13. The descent bush 15 transmits a force couple to the ball-holding bush 16.

The elastic members 24, and in particular the blocks 35 made of elastomeric material thereof, act as element for transferring the force couple between the descent bush 15 and the ball-holding bush 16.

The blocks 35 made of elastomeric material deform, and in particular compress, accumulating elastic energy until the force couple exerted by the descent bush 15 exceeds a value necessary to deform the blocks 35 by a predetermined amount.

The cable-winding bush 13 carries out a rotation in the second angular direction B, moving the rear derailleur towards a smaller toothed wheel of the groupset.

When such a value is exceeded, the force couple exerted by the descent bush 15 sets the cable-winding bush 16 in rotation through the coupling described above between the latter and the descent bush 15. The ball-holding bush 16 rotates with respect to the indexing bush 21 engaging a new stop position 23 thereof.

The cable-winding bush 13 thus continues to rotate and, in particular, carries out a rotation equal to the indexing angle that separates the two stop positions 23 on the indexing bush 21. Such a rotation is such as to move the rear derailleur further by an amount coinciding with the distance that separates two adjacent toothed wheels of the groupset.

Therefore, when the ball-holding bush 16 is positioned in a new stop position 23 on the indexing bush 21, the cable-winding bush has carried out a rotation in the second angular direction B equal to the sum of the indexing angle and of the initial rotation to deform the blocks 35 made of elastomeric material.

The downward gearshifting is thus made easier and prompt.

When the cyclist stops pressing on the control 102, the descent bush 15 is no longer subjected to any force couple. The elastic energy stored by the blocks 35 of elastomeric material is released and the latter expand elastically exerting a force on the axial teeth 32 of the ball-holding bush 16. Since the latter is constrained in rotation by the engagement with the indexing bush 21, the elastic expansion of the blocks 35 determines a rotation of the descent bush 15 along the first angular direction A. The cable-winding bush therefore rotates in the first angular direction A by an amount equal to the initial rotation in the second angular direction B. The final net rotation of the cable-winding bush 13 is therefore equal to the indexing angle between the two stop positions 23 engaged by the sliders.

Of course, those skilled in the art can make numerous modifications and variants to the invention described above, in order to satisfy specific and contingent requirements, like for example providing for different types of elastic members, all in any case encompassed by the scope of protection of the present invention as defined by the following claims.

What is claimed is:

1. An actuation device of a control cable of a bicycle gearshift comprising:
    a casing, configured for fixing to bicycle handlebars;
    a control pin mounted rotatably in said casing about a rotation axis (X);
    a control lever mobile with respect to said casing and active on a descent member coaxial and fixedly connected to said control pin;
    a cable-winding bush mounted coaxially to, and rotatable with, the control pin in a first angular direction (A) and in a second angular direction (B) opposite to the first;
    an indexer mounted coaxially to the control pin and configured to define a plurality of stable angular positions, spaced apart by respective indexing angles, for said cable-winding bush;
    elastic members configured to deform and store elastic energy during a downward gearshifting rotation of the control pin in said second angular direction (B); said elastic members being configured to release the elastic energy stored at an end of the downward gearshifting rotation of the control pin and being configured to cause a stroke recovery rotation of the control pin in said first angular direction (A), during the release of the elastic energy stored; said stroke recovery rotation being of smaller angular size than the indexing angle that separates two adjacent stable positions of the cable-winding bush.

2. The actuation device according to claim 1, wherein said indexer comprises:
    a ball-holding bush mounted in the casing in a rotatable manner about the rotation axis (X) and equipped with at least one pointer;
    an indexing bush mounted in the casing and provided with a fastening track comprising a plurality of stop positions spaced apart by respective indexing angles and able to be engaged in sequence by said pointer during a relative rotation between the ball-holding bush and the indexing bush, each stop position defining a stable angular position for said cable-winding bush;
    a force necessary to rotate said ball-holding bush with respect to said indexing bush being greater than a second force necessary to deform said elastic members by a predetermined amount.

3. The actuation device according to claim 2, wherein said elastic members are active between said indexing bush and said casing.

4. The actuation device according to claim 3, wherein said elastic members are active along a circumferential direction.

5. The actuation device according to claim 4, wherein said indexing bush is mounted rotatably with respect to said control pin and comprises a radially outer tab configured to intercept a lower end stop of the casing; the rotation of the indexing bush being limited in the second angular direction (B) by the lower end stop.

6. The actuation device according to claim 5, wherein said elastic members are arranged on said casing and define said lower end stop.

7. The actuation device according to claim 2, wherein said elastic members comprise a body having a base wall mounted on said casing and two side walls that extend axially away from said base wall; said side walls being elastically yielding in a circumferential direction.

8. The actuation device according to claim 2, wherein said elastic members comprise an elastomer having a first end constrained to said casing and a second free end that extends circumferentially away from the first end.

9. The actuation device according to claim 2, wherein said elastic members couple said ball-holding bush with said control pin in rotation.

10. The actuation device according to claim 9, wherein said descent member is a descent bush rotating as a unit with the control pin.

11. The actuation device according to claim 10, wherein said elastic members are active between said ball-holding bush and said descent bush.

12. The actuation device according to claim 11, wherein one from said ball-holding bush and said descent bush comprises axial teeth inserted in housing seats formed on the other from said ball-holding bush and said descent bush; said elastic members comprising blocks made of elastomeric material inserted in said housing seats and circumferentially in abutment against said axial teeth.

13. The actuation device according to claim 12, wherein said housing seats have a circumferential extension equal to a sum of circumferential extensions associated with said blocks made of elastomeric material and said axial teeth.

14. The actuation device according to claim 1, wherein said elastic members are active between said indexer and said casing.

15. The actuation device according to claim 14, wherein said elastic members are active along a circumferential direction.

16. The actuation device according to claim 14, wherein said indexer is mounted rotatably with respect to said control pin and comprises a radially outer tab configured to intercept a lower end stop of the casing; the rotation of the indexer being limited in the second angular direction (B) by the lower end stop.

17. The actuation device according to claim 16, wherein said elastic members are arranged on said casing and define said lower end stop.

18. The actuation device according to claim 17, wherein said elastic members comprise a body having a base wall mounted on said casing and two side walls that extend axially away from said base wall; said side walls being elastically yielding in a circumferential direction.

19. The actuation device according to claim 17, wherein said elastic members comprise an elastomer having a first end constrained to said casing and a second free end that extends circumferentially away from the first end.

\* \* \* \* \*